(12) United States Patent
Painchault

(10) Patent No.: US 7,571,378 B2
(45) Date of Patent: Aug. 4, 2009

(54) METHOD OF LINEAR ENCODING FOR ERRATIC TRANSMISSIONS

(75) Inventor: Philippe Painchault, Asnieres (FR)

(73) Assignee: Thales (FR)

( * ) Notice: Subject to any disclaimer, the term of this patent is extended or adjusted under 35 U.S.C. 154(b) by 526 days.

(21) Appl. No.: 10/935,358

(22) Filed: Sep. 8, 2004

(65) Prior Publication Data

US 2005/0057962 A1 Mar. 17, 2005

(30) Foreign Application Priority Data

Sep. 12, 2003 (FR) ................................. 03 10760

(51) Int. Cl.
*H03M 13/00* (2006.01)
(52) U.S. Cl. ..................................... 714/821
(58) Field of Classification Search .................. 380/29; 714/821
See application file for complete search history.

(56) References Cited

U.S. PATENT DOCUMENTS

| | | | | |
|---|---|---|---|---|
| 4,399,323 A | * | 8/1983 | Henry | 380/30 |
| 5,768,390 A | * | 6/1998 | Coppersmith et al. | 380/42 |
| 2002/0114451 A1 | * | 8/2002 | Satterfield | 380/37 |
| 2002/0118827 A1 | * | 8/2002 | Luyster | 380/37 |

FOREIGN PATENT DOCUMENTS

| | | |
|---|---|---|
| EP | 1 244 237 | 9/2002 |
| WO | WO 01/03366 | 1/2001 |

OTHER PUBLICATIONS

Tremblay M., et al., "Support for Fault Tolerance in VLSI Processors", Proceedings of the International Symposium on Circuits and Systems, May 8, 1989; pp. 388-393

Kammer, Raymond G. and William Mehuron, "Data Encryption Standard", National Bureau of Standards, U.S. Department of Commerce, Jan. 1977, FIPS PUB 46-3, pp. 1-22.

* cited by examiner

*Primary Examiner*—Guy J Lamarre
*Assistant Examiner*—Sam Rizk
(74) *Attorney, Agent, or Firm*—Lowe Hauptman Ham & Berner, LLP

(57) ABSTRACT

A method is disclosed for the transmission of information. The information contains n information carrier cells, with n being greater than or equal to 2. The method of linear encoding for erratic transmission includes at least the following steps: generating a mask $\{Mi\}_{i=1,n}$ of n cells corresponding to n information carrier cells; making a linear combination of at least all the n cells with the n cells of the generated mask to obtain a resulting word; performing a linear operation on the n cells of the resulting word to obtain a cell $B_{T,j}$ to be transmitted.

13 Claims, 2 Drawing Sheets

METHOD OF LINEAR ENCODING FOR ERRATIC TRANSMISSIONS

RELATED APPLICATION

The present application is based on, and claims priority from, French Application No. 03 10760, filed Sep. 12, 2003, the disclosure of which is hereby incorporated by reference herein in its entirety.

BACKGROUND OF THE INVENTION

1. Field of the Invention

The invention relates to a method for the transmission of information.

It can be applied especially in all cases where the effective moments of transmission are not explicitly controlled. This includes, for example, the following cases

- the receiver uses a looped information item and can start listening at any instant whatsoever with a channel that is assumed to be sufficiently jammed to render the simple looped sending of information inefficient as a strategy. This system is especially adapted to cases where there are the gaps in transmission (due to fading, error detection code.).
- a same piece of information is or can be broadcast by several transmitters, and all the information transmitted should be capable of being used.

2. Description of the Prior Art

There are known ways in the prior art of transmitting information by using linear error corrector codes. In this case, a word of fixed size is converted into another word of fixed size. The codes used are, for example, convoluted codes that vary in time, possibly with interlacing. However, even these codes consider only local variations of the linear combinations and do not cover the potential dependence of all the inputs. Furthermore, the decoding process is based on a general algorithm of resolution of the linear system and not on a specific process.

Should the information to be transmitted be a given message to be sent, another strategy consists in the re-sending the message continually. This strategy may be efficient if the error rate is low and if only one sending source is present at a point in time. In this case, the average time for obtaining all the data may approach the size of the data. However, as soon as the probability of the error increases, the necessary listening time may increase substantially.

SUMMARY OF THE INVENTION

The invention relates especially to a method for the transmission of information, said information containing n information carrier cells, with n being greater than or equal to 2. The method is characterized by the fact that it comprises at least the following steps:

a) generating a mask $\{Mi\}_{i=1,n}$ of n cells corresponding to n information carrier cells,
b) making a linear combination of at least all the n cells with the n cells of the generated mask to obtain a resulting word,
c) performing a linear operation on the n cells of the resulting word to obtain a cell $B_{T,j}$ to be transmitted.

The method may comprise the following steps:

d) for each cell $B_{T,j}$ received, determining the corresponding mask $\{Mi\}_{i=1,n}$,
e) inverting the linear system formed by the p cells received.

A cell is, for example, a bit or a symbol.

The method may include a preliminary step where the information packets to be transmitted are broken down into several sub-packets.

The invention also relates to an information transmission device comprising:

a transmitter adapted to generating a mask $\{Mi\}_{i=1,n}$ of n cells corresponding to the n information carrier cells and obtained from a piece of information, common to the cells sent and in using a law "Deriv" such that $\{Mi\}_{i=1,n}=\text{Deriv}(T,j)$, carrying out a linear combination of at least all the n cells with the n cells of the mask generated to obtain a resulting word, and performing a linear operation on the n cells of the resulting word to obtain a cell $B_{T,j}$ to be transmitted, a receiver adapted to determining the corresponding mask $\{Mi\}_{i=1,n}$ for each cell $B_{T,j}$ received and inverting the linear system formed by the p cells received.

The invention also relates to a receiver adapted to determining a mask $\{Mi\}_{i=1,n}$ of n cells corresponding to the n information carrier cells and obtained from a piece of information common to the cells sent and in using a law "Deriv" such that $\{Mi\}_{i=1,n}=\text{Deriv}(T,j)$.

The method offers especially the following advantages:

it reduces the time taken to reconstitute data at the receiver. According to different assumptions on the system, it is possible for example to gain time of the order of $$\frac{K}{\log(N)},$$

where N is the number of data bits to be transmitted and where K typically ranges from 1 to 2.
this system enables the use of several transmitters.
in the case of looped sending, the receiver can put itself into a state of listening at the times that it wishes.
the quantity of information received by the receiver is directly proportional to the transmission time, it is not limited to the structure of the code; the mask used is built at each instant, and is variable in time.

BRIEF DESCRIPTION OF THE DRAWING

Other features and advantages of the invention shall appear more clearly from the description of an exemplary embodiment given by way of a non-restrictive example and illustrated with reference to the single FIG. 1 which represents a system for the exchange of information between a transmitter and a receiver.

In order to provide for a clearer understanding of the principle implemented by the invention, the following example relates to a method for the transmission of information between a transmitter and a receiver. The information to be transmitted takes the form of information carrier bits and it is assumed in the method that the transmitter and the receiver share common data-indexing information, such as the time, the frame number, etc. This common information references the bit. Without departing from the framework of the invention, the system may comprise several transmitters.

The method assumes, in principle, that the receiver cannot communicate back to the transmitter to inform it of the packets that it has received. This may be the case in broadcasts to large numbers of receivers.

In the following description, the term "bit" and the AND and XOR logic operations are used. The principles apply however to any elementary information carrier cell and any form of linear law.

Figure 1:
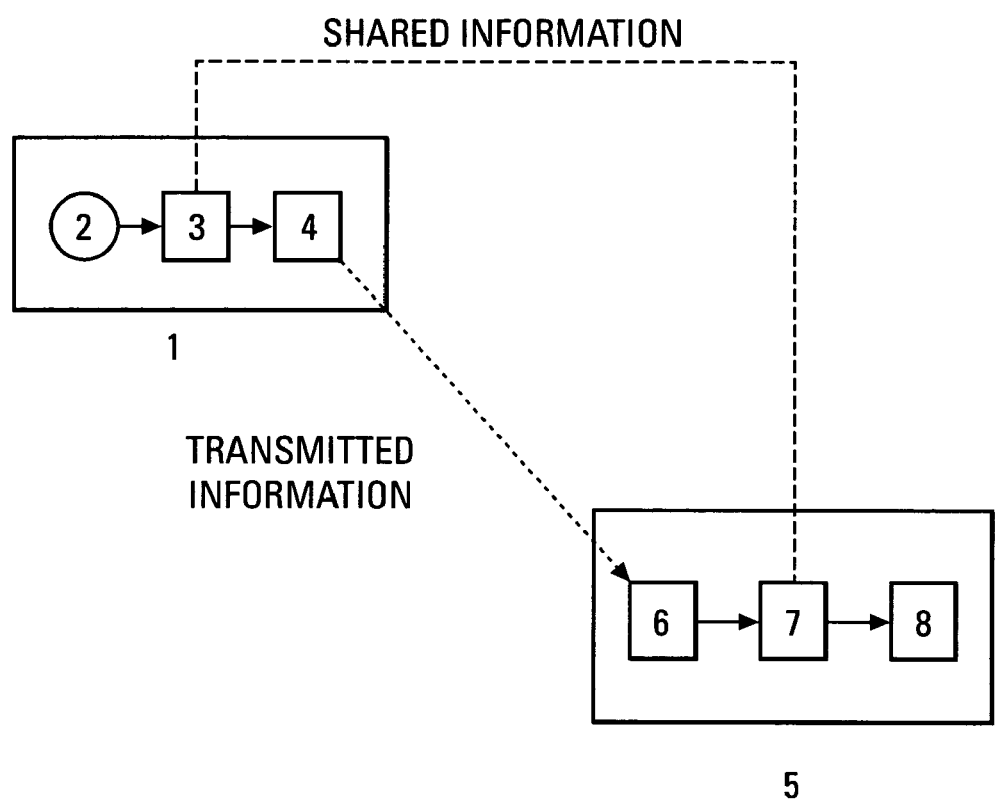

FIG. 1 gives a diagrammatic view of an example of a system of information transmission according to the invention, comprising for example:

a transmitter 1 comprising a first block 2 corresponding to the data to be transmitted, a device 3 according to the invention, adapted to the generation of variable masks in general and to the manufacture of linear combinations, this device 3 having access to the shared information, any unspecified channel encoder 4 adapted to the effective channel, a receiver 5 comprising a channel decoder 6, a device 7 for the analysis of the data received, this device having access to the shared information and a part 8 adapted to the performance of linear analysis according to the steps of the method.

Figure 2:
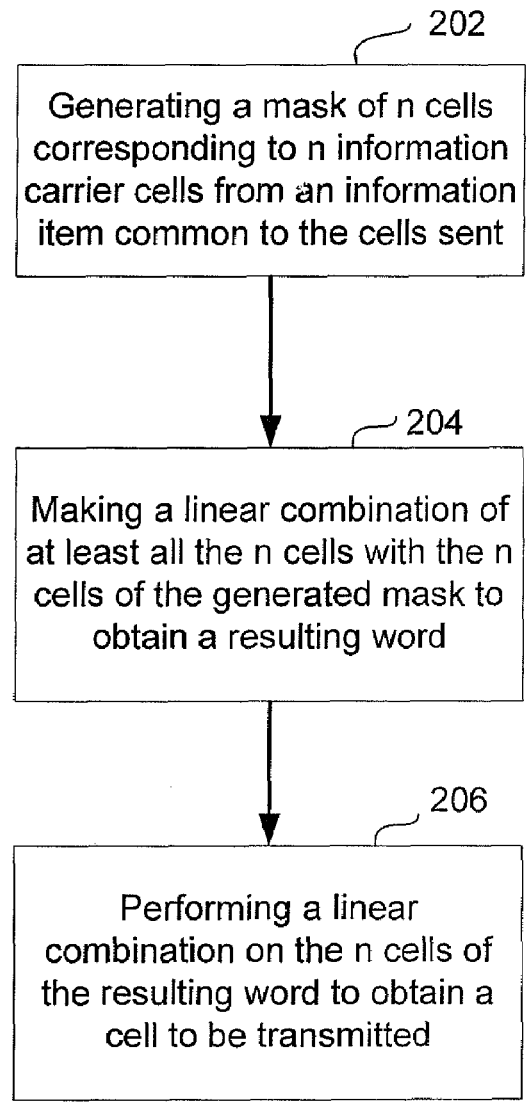

FIG. 2 illustrates one embodiment of a method for the transmission of information wherein the information contains n information carrier cells, with n being greater than or equal to 2. Functionality 202 includes generating a mask $\{Mi\}i=1,n$ of n cells corresponding to n information carrier cells, from an information item common to the transmitted cells. Functionality 202 includes making a linear combination of at least all the n cells with the n cells of the generated mask to obtain a resulting word, and functionality 206 includes performing a linear operation on the n cells of the resulting word to obtain a cell BT,j to be transmitted.

The method according to the invention comprises at least the steps described here below:

At the Level of the Transmitter

From the common information referencing the bits sent, for each bit bi sent, the method makes several linear combinations of the data to be transmitted, as follows:

a) for example, for a common piece of information constituted by a frame number T and a bit number j, and for data to be transmitted to taking the form of n bits $\{Di\}i=1,n$, the method defines a law designated as "Deriv" that makes it possible, on the basis of the common information, in this case the frame number, to derive a mask M of n bits:

$$\{Mi\}_{i=1,n} = \text{Deriv}(T, j) \quad (1)$$

The declaration varies as a function of time. The masks, in normal operation, are not repeated regularly in order that there be no loss of information during the reconstitution. The distribution of the data is done on a large number of instants.

b) a linear combination is done in using a logic function, for example the "AND" function. This is done on a bit-to-bit basis between a bit j of the data to be transmitted and the corresponding bit Mj of the mask generated. This operation is carried out n times, thus making it possible to obtain a resulting word comprising n bits. An XOR operation is performed on all the bits of the resulting word in order to obtain a bit $B_{T,j}$ $$B_{T,j} = \bigoplus_{i=1,n} (D_i \wedge M_i) \quad (2)$$

The data bits to be transmitted may be buffered to perform the step b). The linear combination depends on the time.

According to another alternative embodiment, when several transmitters are taken into account, the method defines a law designated as "Deriv", making it possible to derive a mask M of n bits from the common information: $\{Mi\}_{i=1,n}=\text{Deriv}(T, j, k)$ where k corresponds to the reference of a transmitter. This variant can be applied for example in the case of a satellite system.

At the Level of the Receiver

The method reconstitutes the information after having obtained a sufficient number p of information bits. The number p of bits is for example equal to the number n of bits of the information transmitted.

c) For each bit $B_{T,j}$ received, the method computes the corresponding mask $\{Mi\}_{i=1,n}$ according to the relationship (1). The received bit $B_{T,j}$ and the corresponding mask Mj, form a linear equation. After having received p bits, the linear system thus constituted (received bit $B_{T,j}$ with j varying from 1 to p, and the p corresponding masks) is reversible with a high probability, when the number p of bits received is greater than or equal to the number n of bits to be sent.

d) Inverting the linear system to retrieve the bits sent. The linear system obtained is any linear system.

The system may listen at the time that it wishes. Any additional information may thus be used. This leads to a consistent system.

According to one alternative embodiment, when the information to be transmitted is constituted by large-sized packets, the method comprises a preliminary step where the packets are subdivided into sub-packets 10 according to methods known to those skilled in the art.

For example, a packet size of 64 bits makes it possible to keep good levels of performance while limiting the complexity of resolution of the linear systems. The common information is then also used to determine the data block to be considered.

It is also possible to use CRC controls for large-sized packets.

The following numerically quantified example, given for a system with one transmitter, illustrates the method according to the invention:

We consider, for example, a system consisting of a transmitter that has to transmit a piece of information D of a known size, with a common time reference (T, j), referencing each bit to be sent. The transmitter has an identifier No.

The information D is subdivided into N 64-bit blocks.

The DES enciphering algorithm ([DES]) is used. The key chosen is the identifier No. For each bit j to be transmitted, the transmitter computes the enciphered value of the temporal information (T, j) indexing the bit: $M=\text{DES}_{NO}((T, j))$. This computation gives 64 bits at output. The transmitter then takes the scalar product between M and the data of the block (T % N). The bits sent is the result bit of this scalar product.

The receiver also performs the computation: $\text{DES}_{NO}((T, j))$, as well as the computation of the modulo (T % N). It thus has parameters of the combination and of the result. This data feeds a set of linear resolution systems. After a sufficient number of observations have been made, these systems enable the retrieval of the information to be transmitted.

The enciphering algorithm [DES] NBS FIPS PUB 46 is described for example in the document entitled "Data Encryption Standard" National Bureau of Standards, U. S. Department of Commerce, Jan. 1977.

Without departing from the scope of the invention, the system according to the invention has several transmitters. The laws and the steps implemented are identical to those described within the context of one transmitter, the identifier No differentiating the transmitters.

In this case, if the receiver can physically and simultaneously obtain data coming from several transmitters, the transmission is accelerated to the same extent. Indeed, the linear combinations depending on the transmitter number are different from one transmitter to another, and hence the linear equations obtained may be exploited independently.

What is claimed is:

1. A method for the transmission of information, said information containing at least a quantity of n information carrier cells, with n being greater than or equal to 2, said method comprising at least the following steps:

generating a mask $\{Mi\}_{i=1,n}$ of n cells corresponding to n information carrier cells, from an information item common to the cells sent and using a law Deriv such that:

$$\{Mi\}_{i=1,n} = \text{Deriv}(T, j, k) \quad (1);$$

wherein T corresponds to a frame number, j corresponds to a bit number, and k corresponds to a transmitter reference number;

generating a linear combination on n information carrier cells with the n cells of the generated mask Mi to form a resultant word of n cells;

performing a linear operation on each of the n cells of the resultant word to generate a cell $B_{T,j}$;

transmitting a p number of cells $B_{T,j}$, where p is greater than n;

receiving the p transmitted $B_{T,j}$ cells;

reconstituting the information carrier cells by computing, for each cell $B_{T,j}$ received, the corresponding mask $\{Mi\}_{i=1,n}$ according to relationship (1);

forming a reversible linear equation of p cells using received bit $B_{T,j}$ where j=1 to p, and corresponding mask Mj, when the number p of cells received is greater than n; and inverting the linear equation of p cells formed to generate the n information carrier cells.

2. The method according to claim 1, further comprises:
receiving the p cells transmitted, wherein each received cell equals $B_{T,j}$, determining the corresponding mask $\{Mi\}_{i=1,n}$, and
inverting a linear system formed by the p cells received.

3. The method according to claim 1, wherein a cell is a bit.

4. The method according to claim 1, wherein a cell is a symbol.

5. The method according to claim 1, wherein the linear combination is made by performing a logic function such as the "AND" function.

6. The method according to claim 1, wherein the linear operation of the n cells of the resulting word is an "XOR" operation.

7. The method according to claim 1, comprising a preliminary step in which the packets of information to be transmitted are sub-divided into several sub-packets.

8. An information transmission device, comprising:

a transmitter arranged to generate a mask $\{Mi\}_{i=1,n}$ of n cells corresponding to n information carrier cells, from an information item common to the information carrier cells and using a law Deriv such that:

$$\{Mi\}_{i=1,n} = \text{Deriv}(T, j, k) \quad (1);$$

wherein T corresponds to a frame number, j corresponds to a bit number, and k corresponds to a transmitter reference number, the transmitter configured to: generate a word of n cells by linear combination of n information carrier cells with n cells of the mask $\{Mi\}_{i=1,n}$; perform a linear operation on each of the n cells of the resultant word to generate a cell $B_{T,j}$; and transmit a p number of $B_{T,j}$ cells with p at least equal to n; and a receiver configured to receive p transmitted cells and reconstitute the information carrier cells for each bit $B_{T,j}$ received;

the receiver configured to compute the corresponding mask $\{Mi\}_{i=1,n}$ according to relationship (1), form a reversible linear equation using received bit $B_{T,j}$ where j=1 to p, and corresponding mask Mj, when the number p bits received is greater than the number of n carrier cells; and invert the linear equation formed;

wherein the receiver is arranged to receive a piece of information containing n information carrier cells, with n being greater than or equal to 2, said receiver comprising:

a determining means for determining a mask $\{Mi\}_{i=1,n}$ of n cells corresponding to the n information carrier cells and obtained from a piece of information common to the cells sent and in using a law Deriv such that $\{Mi\}_{i=1,n} = \text{Deriv}(T, j)$.

9. The device of claim 8, wherein a cell is a bit.

10. The device of claim 8, wherein a cell is a symbol.

11. The device of claim 8, wherein the linear combination is made by performing a logic function such as the "AND" function.

12. The device of claim 8, wherein the linear operation of the n cells of the resulting word is an "XOR" operation.

13. The device of claim 8, comprising a preliminary step in which the packets of information to be transmitted are sub-divided into several sub-packets.

* * * * *